United States Patent [19]

DeRidder

[11] 4,183,573

[45] Jan. 15, 1980

[54] BOOT PROTECTION AND ANTITHEFT APPARATUS

[76] Inventor: Alvin H. DeRidder, 19146 Anne La., Cupertino, Calif. 95014

[21] Appl. No.: 898,764

[22] Filed: Apr. 21, 1978

[51] Int. Cl.[2] .......... B60P 3/32

[52] U.S. Cl. .......... 296/166; 280/762

[58] Field of Search .......... 296/23 R, 23 MC, 24 R, 296/1 R; 280/748, 749, 727, 762, 770

[56] References Cited

U.S. PATENT DOCUMENTS

| | | | |
|---|---|---|---|
| 3,321,234 | 5/1967 | Harrell | 296/23 MC |
| 3,632,155 | 1/1972 | Parker | 296/24 R |
| 3,695,676 | 10/1972 | Clark | 296/23 MC |
| 3,767,252 | 10/1973 | Hathaway | 296/23 MC |
| 3,897,100 | 7/1975 | Gardner | 296/23 R |
| 4,015,875 | 4/1977 | Setina | 296/24 R |

*Primary Examiner*—Joseph F. Peters, Jr.

*Assistant Examiner*—John A. Carroll

*Attorney, Agent, or Firm*—Claude A. S. Hamrick

[57] ABSTRACT

A boot protection and antitheft apparatus which protects the flexible hollow boot extending between an opening in the forward surface of a camper shell and the rear window frame of a pickup truck cab. The apparatus includes two side members, which are substantially mirror images of each other, each of which includes a flat panel for substantially closing the opening between the truck cab and the camper shell and an angularly depending rectangular flange intersecting along one of the edges of each panel for facilitating attachment to the cab of the pickup truck. The apparatus is connected to the cab of the truck such that the flanges are inaccessible from the exterior and the panels are mounted substantially parallel to the sides of the cab rear window and are angled in towards each other at the ends approaching the camper shell.

5 Claims, 7 Drawing Figures

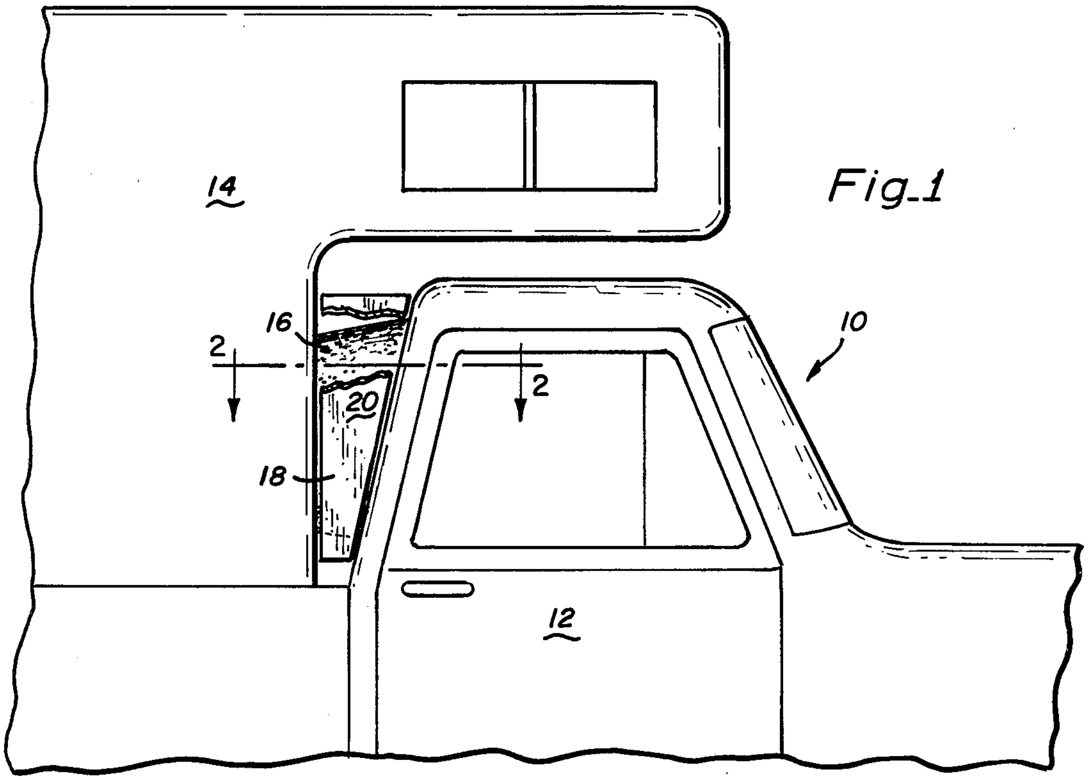
Fig_1
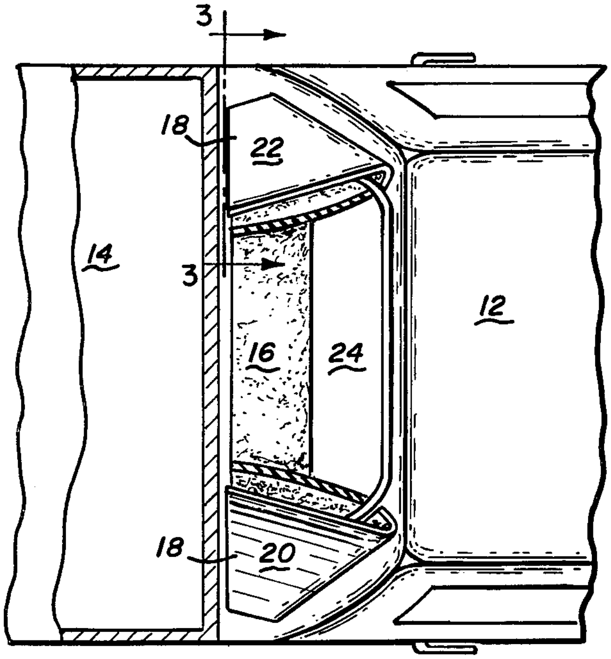
Fig_2
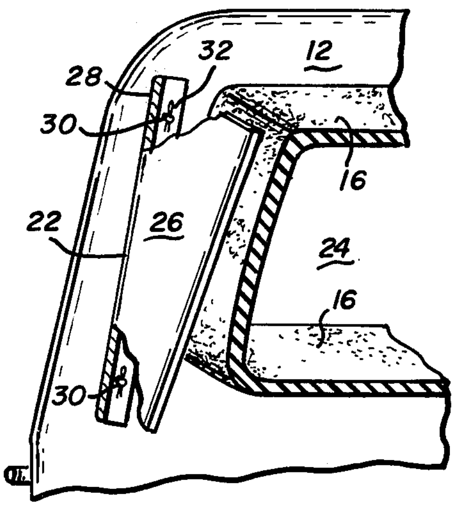
Fig_3

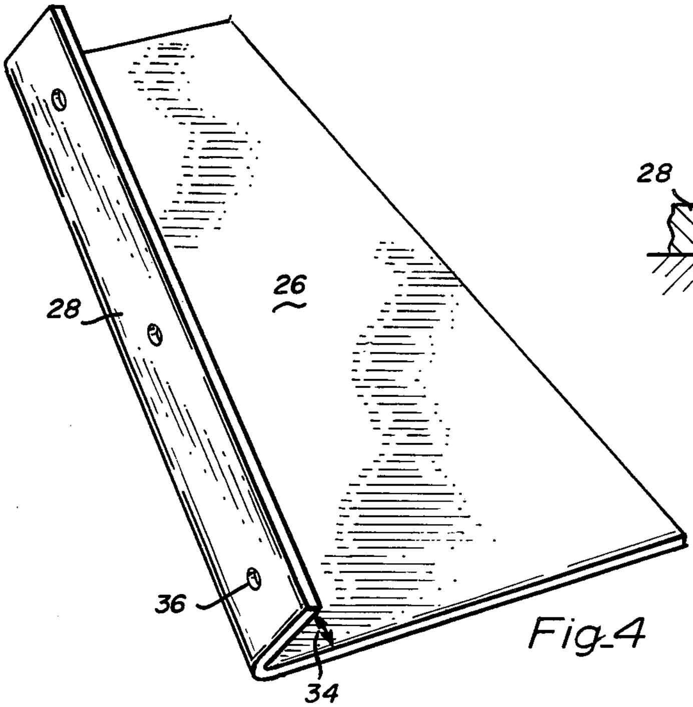
Fig_4
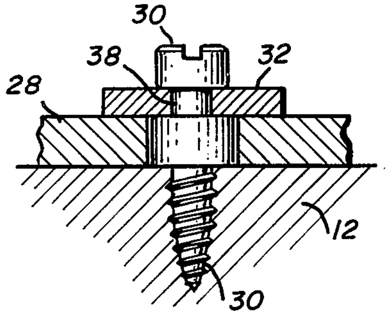
Fig_5
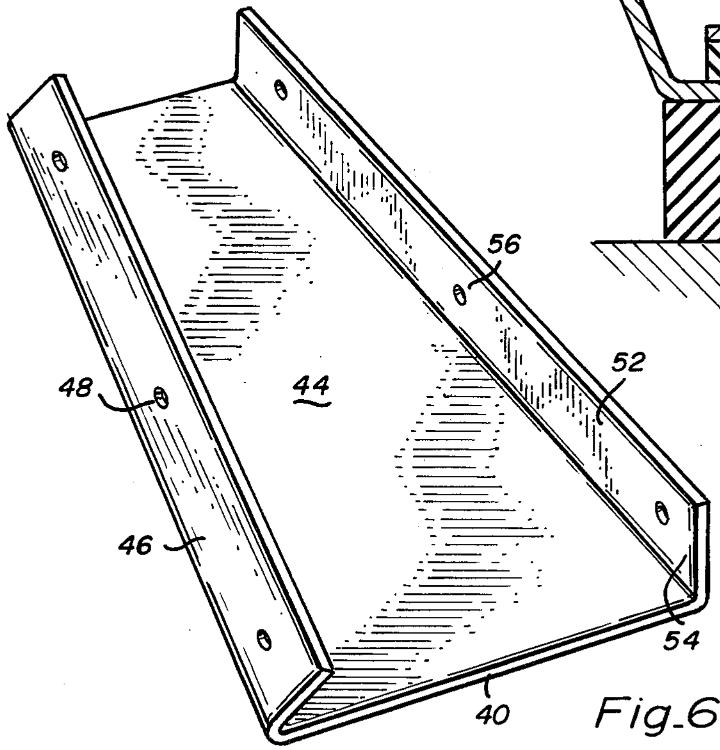
Fig_6
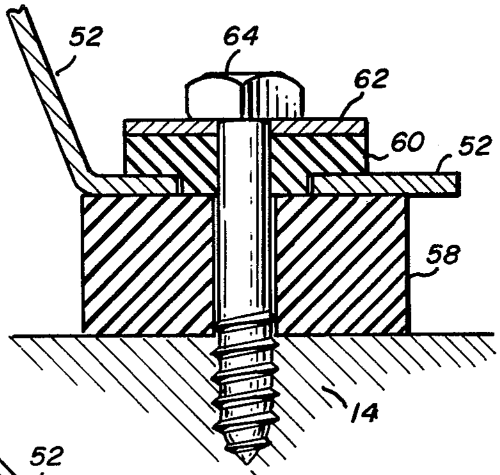
Fig_7

BOOT PROTECTION AND ANTITHEFT APPARATUS

BACKGROUND OF THE INVENTION

1. Field of the Invention

This invention relates generally to security apparatus for vehicles, and more particularly to security apparatus for truck campers of the type having a flexible boot extending between the camper shell and the truck cab.

2. Description of the Prior Art

Many truck campers are designed so that a flexible hollow connector, known as a boot, may be attached between the front window frame of the camper shell and the rear window frame of the truck cab to allow for communication and transfer of small items such as food between those persons in the cab and those persons in the camper even while the vehicle is in motion. In the normal case the rear window of the cab is removed and snap fasteners are provided around the inside of the cab window frame to facilitate boot attachment.

In those applications where more than a few inches of space separate the cab and the camper shell, a problem arises in that the boot can be unsnapped from the exterior of the cab by merely applying force to the side of the boot, or the boot can be easily cut from the side of the camper. This, of course, makes it possible for would-be thieves or vandals to gain access to the interior of the cab by disconnecting or cutting the boot, reaching through the rear window and unlocking the door from the inside. Consequently, theft and vandalism pose a substantial problem to the owners of campers so equipped.

No effective device for alleviating this problem has heretofore been made available. Permanently affixed boots have been tried but these remain vulnerable to cutting of the boot material. Impervious boots are impractical since they must be flexible to accommodate the inevitable shifting and bouncing of the camper shell relative to the cab, and flexible, reasonably lightweight materials which are sufficiently resistive to cutting are prohibitively expensive.

SUMMARY OF THE PRESENT INVENTION

It is therefore an object of this invention to provide effective apparatus for preventing unauthorized access to the interior of truck/camper units having an interconnecting boot provided between the camper shell and the rear window of the truck cab.

Another object of this invention is to provide an inexpensive camper boot protection and antitheft apparatus.

A further object of this invention is to provide a camper boot protection and antitheft apparatus which may be easily installed and removed.

Briefly, the preferred embodiment of the present invention consists of a pair of side members and means for attaching the side members to the cab of the camper truck. Each side member includes a planar semirigid panel for substantially closing the opening between the truck cab and the camper shell so that it is extremely difficult or impossible to reach around the panel to the boot or to the window frames. A rectangular flange intersects the panel at an acute angle along at least a portion of an edge of the panel for attaching the panel to the surface of the rear of the truck cab proximate to the rear window frame. The means for attaching a side member to the truck cab includes screws or pins which pass through apertures form in the flange.

An advantage of the present invention is that it provides an economical effective means for protecting truck campers using boots from vandalism and theft.

Another advantage of this invention is that it may be easily installed onto and removed from the truck cab.

A further advantage of this invention is that it is connected to the truck cab in such a manner that the connectors are only accessible from the interior of the cab.

Yet another advantage of the present invention is that it tends to reduce turbulent buffeting of the boot caused by the motion of the truck camper.

These and other objects and advantages of the present invention will no doubt become apparent to those skilled in the art following a reading of the following detailed description which makes reference to the several figures of the drawing.

IN THE DRAWING

FIG. 1 is a partially broken left side-elevational view showing the present invention installed upon the cab of a pickup truck having a camper shell;

FIG. 2 is a partially broken top plan view showing the apparatus of the present invention installed upon a truck cab;

FIG. 3 is a partially broken section taken along lines 3—3 of FIG. 2;

FIG. 4 is a perspective view of one of the side members illustrated in FIGS. 1, 2 and 3;

FIG. 5 is a side elevational view of a vertical cross at one of the connectors used to install the invention to the truck cab shown as installed.

FIG. 6 is a perspective view of an alternate embodiment of the side member illustrated in FIG. 4;

FIG. 7 is a vertical cross-sectional of a means for connecting the alternative side member illustrated in FIG. 6 to the camper shell.

DESCRIPTION OF THE PREFERRED EMBODIMENT

Referring now to FIG. 1, a partially broken left side elevational view of the invention shown installed upon a truck camper. The figure illustrates a truck camper 10 including a cab 12 and a camper shell 14. Connecting the rear window frame of the truck cab 12 to the front surface of camper shell 14 is a flexible, hollow boot 16. Installed upon the rear surface of truck cab 12, at points exterior to the boot, is the invention, a boot protection and antitheft apparatus, partially broken in order to allow viewing of boot 16.

Referring now to FIG. 2, a partially broken top plan view showing a section taken along line 2—2 of FIG. 1, illustrating the present invention as installed on a camper truck. Boot protection and antitheft apparatus 18 is shown as protecting boot 16 from access from the exterior of the camper and truck combination. Left side member 20 is shown installed such that it essentially parallels the left side of rear truck cab window 24 and right side member 22, approximately a mirror image of left side member 20, is shown installed such that it is nearly parallel to the right side of rear truck cab window 24. The rear edges of side members 20 and 22 are closer together than their front edges. This arrangement allows close protection of boot 16.

Referring now to FIG. 3, a rear elevation of a cross-section taken along line 3—3 of FIG. 2 illustrating the angle of installation of right side member 22. Boot 16 is cut away to show truck cab rear window 24 and to indicate how boot 16 has a progressively smaller cross section at points progressively further from truck cab 12.

Right side member 22 is illustrated partially broken such that all portions of the side member may be shown.

The main protecting surface of the side member is planar panel 26. Intersecting one edge of panel 26 at an acute angle and connected to panel 26 is rectangular flange 28. Side member 22 is connected to truck cab 12 by connecting members 30 attached to the truck cab and clevis pins 32 which hold flange 28 over connecting members 30 between truck cab 12 and clevis pin 32.

FIG. 4 is a perspective view of right side member 22 showing the interrelationship between panel 26 and flange 28. In the preferred embodiment side member 22 is all one piece of material with flange 28 being merely bent at an acute angle to panel 26. The angle of intersection 34 between flange 28 and 26 is approximately 55° in the preferred embodiment however, this is varied depending on the particular camper and boot upon which the apparatus is installed. Also shown are apertures 36 in flange 28 to allow side member 22 to be installed upon the truck camper.

FIG. 5 illustrates a preferred connector used to hold side members 20 and 22 to the truck cab. Connector 30 is screwed into or otherwise firmly attached to the body of truck cab 12 and has a narrow neck 38 at a point further from truck cab 12 than the thickness of flange 28. In the preferred embodiment connectors 30 are placed into the back wall of truck cab 12 at point proximate the sides of rear window 24. Apertures 36 and flange 28 fit over connector 30 such that flange 28 lies flat against the surface of the truck shell. Clevis pin 32 then snaps over neck 38 such that flange 28 is held firmly against the cab.

FIG. 6 illustrates an alternate embodiment of the present invention wherein alternate right side member 40 and alternate left side member 42 (not shown), a mirror image of right side member 40, have an additional flange for attaching the side member to the body of the camper shell as well as to the truck cab. Alternate right side member 40 includes a flat panel 44 which is roughly the same shape as the opening between truck cab 12 and camper shell 14. Intersecting one edge of panel 44 is first flange 46 having apertures 48 for installation of side member 40 upon the truck cab. First flange 46 intersects panel 44 at an angle of intersection 50. In the preferred alternate embodiment angle of intersection 50 is approximately 55°. Intersecting the opposite edge of panel 44 from first flange 46 is second flange 52. Second flange 52 intersects panel 44 at angle of intersection 54. Angle of intersection 54 is approximately supplementary to angle of intersection 50 in the general case and in the preferred alternate embodiment is approximately 125°. Located approximately at the center of second flange 52 is a large aperture 56 which provides for attachment of alternate right side member 40 to the camper shell.

FIG. 7 illustrates a means for securing alternate side member 40 to the front surface of the camper shell. A flexible cushion 58 is placed between second flange 52 and camper shell 14. A flexible bushing 60 is placed onto second flange 52 such that it fits into aperture 56. A washer 62 is then placed on top of a flexible bushing 60. Penetrating washer 62, flexible bushing 60, aperture 56 of second flange 52 and flexible cushion 58 and being firmly attached to camper shell 14 is connecting screw 64. The diameter of connecting screw 64 is significantly smaller than the diameter of aperture 56. This arrangement allows for reasonably firm connection which will still provide for shifting and bouncing of the camper shell with respect to the truck cab during motion of the vehicle.

When installed upon a truck camper, the present invention protects the boot connecting the camper shell and the truck cab. The invention accomplishes this objective by the placing of rigid side panels close to and substantially parallel to the side of the boot. These panels are shaped such that when installed they substantially close the opening between the truck cab and the camper shell such that it is difficult or impossible for a would-be thief or vandal to obtain access to the boot and then to the interior of the cab through this opening. The side panels are attached to the truck cab by connectors passing through apertures and flanges attached to the side panels. These flanges are to the inside; that is, to the boot side of the panel such that they cannot be reached from outside the camper truck and can only be reached from the inside of the cab or the inside of the camper shell.

For easy installation and removal, the connectors are permanently attached to the truck cab and are arranged such that apertures in the flanges fit over the connectors so that clevis pins hold these side panels in place.

In the alternative embodiment these side members are attached to the camper shell as well as to the truck cab. Since a certain amount of relative motion between the camper shell and the truck cab is inevitable during the motion of the vehicle the connection between the side member and the camper shell must be necessity be flexible. It is desirable that this connection also be inaccessible from the exterior of the camper. These objectives are accomplished in the apparatus by the use of a second flange attached to the side member. The second flange is parallel to the surface of the camper shell. A large aperture is located near the center of this flange and through this aperture using a flexible pad, a brushing, a washer and a connecting screw, the flange is securely but flexibly attached to the camper shell.

The boot protection and antitheft apparatus of the present invention is produced using commercial connecting screws and clevis pins, flexible pads, washers, and bushings. The side members in the preferred embodiment are constructed of metal, but any semirigid, high impact material may be substituted.

Depending on the particular type of truck and camper involved the shape of the side panels and the angles at which they intersect the flanges will vary such that the side members still effectively close the opening between the cab and the camper.

Furthermore, any of several methods may be used to attach the side members to the cab so long as the method accomplishes the objectives of a firm, easily installed connection which is inaccessible from the exterior of the truck camper.

Although the present invention has been described above with reference to a particular preferred embodiment, it is to be understood that various alterations and modifications thereof will be obvious to those skilled in the art. It is therefore intended that the appended claims be interpreted to cover all such modifications as fall within the true spirit and scope of the invention.

What is claimed is:

1. A boot protection and antitheft apparatus for attachment to a standard truck cab between it and the camper to protect a flexible, hollow boot extending between an opening in a forward surface of the camper shell and the rear window frame of the truck cab, comprising:

a first side member including a panel of substantially trapezoidal configuration so as to have generally the same shape as a vertical cross section of the space between the truck cab and camper shell except that the horizontal dimensions thereof are somewhat larger than said space, and a rectangular flange formed along one of the edges of said panel at an acute angle to provide means for attachment of said side member to said truck cab with said panel deflected inwardly toward the boot;

a second side member which is substantially a mirror image of said first side member; and means for connecting said side members to the truck cab at points along the sides of the rear window frame, the vertical edges of said panels opposite said one edge being disposed closer to each other than said flanges are disposed relative to each other whereby interference between said opposite edges and the front of the camper shell will prevent said panels from being deflected outwardly.

2. A boot protection and antitheft apparatus as recited in claim 1 wherein each said flange is a continuous extension of each said panel.

3. A boot protection and antitheft apparatus as recited in claim 1 wherein said means for connecting include connectors firmly attached to the rear wall of the truck cab such that the apertures in the said flange portions fit over said connectors, and clevis pins for engaging said connectors to secure said flange portions between said clevis pin and said rear wall of the truck cab.

4. A boot protection and antitheft apparatus as recited in claim 1 wherein said side members each include a second flange formed along said opposite edge, and means are provided for connecting said second flanges to said camper shell.

5. A boot protection and antitheft apparatus as recited in claim 4 wherein said means for connecting said second flanges to the front surface of the camper shell include, a plurality of apertures along said second flange;

a flexible pad having apertures corresponding to the apertures in said flange;

flexible bushing means;

washer means; and connecting bolt means having screw diameters substantially less than that of said apertures, and passing through said washer means, said bushing means, said apertures, said second flange and said flexible pad to resiliently connect said second flange to the camper shell.

* * * * *